US012576426B2

(12) United States Patent
Nabeta et al.

(10) Patent No.: US 12,576,426 B2
(45) Date of Patent: Mar. 17, 2026

(54) MULTILAYER BODY AND METHOD FOR PRODUCING MULTILAYER BODY

(71) Applicant: Taisei Kako Co., Ltd., Osaka (JP)

(72) Inventors: Muneaki Nabeta, Ibaraki (JP); Yoshihiro Matsushita, Ibaraki (JP); Kenji Ohnishi, Ibaraki (JP)

(73) Assignee: Taisei Kako Co., Ltd., Osaka (JP)

( * ) Notice: Subject to any disclaimer, the term of this patent is extended or adjusted under 35 U.S.C. 154(b) by 597 days.

(21) Appl. No.: 17/430,446

(22) PCT Filed: Jan. 31, 2020

(86) PCT No.: PCT/JP2020/003748

§ 371 (c)(1), (2) Date: Aug. 12, 2021

(87) PCT Pub. No.: WO2020/166391

PCT Pub. Date: Aug. 20, 2020

(65) Prior Publication Data

US 2022/0119557 A1 Apr. 21, 2022

(30) Foreign Application Priority Data

Feb. 13, 2019 (JP) ................................ 2019-023387

(51) Int. Cl.

*B05D 3/06* (2006.01)
*B05D 7/00* (2006.01)
*B05D 7/14* (2006.01)
*C08F 2/50* (2006.01)
*C08F 20/06* (2006.01)

(52) U.S. Cl.

CPC ............ *B05D 3/067* (2013.01); *B05D 7/146* (2013.01); *B05D 7/546* (2013.01); *C08F 2/50* (2013.01); *C08F 20/06* (2013.01); *B05D 2202/25* (2013.01); *B05D 2254/00* (2013.01); *B05D 2502/00* (2013.01)

(58) Field of Classification Search

CPC . B05D 7/546; F16L 9/147; B32B 1/08; B32B 15/085; B32B 27/08; B29C 48/151; B29C 48/21; B29C 48/09

See application file for complete search history.

(56) References Cited

U.S. PATENT DOCUMENTS

| | | | | |
|---|---|---|---|---|
| 2006/0019114 A1* | 1/2006 | Thies | C03C 17/007 | 428/522 |
| 2009/0000508 A1* | 1/2009 | Edison | C09D 11/101 | 522/174 |
| 2009/0233029 A1* | 9/2009 | Vogt | B05D 7/58 | 525/474 |
| 2010/0084037 A1* | 4/2010 | Ericsson | B32B 15/20 | 138/146 |
| 2016/0257818 A1 | 9/2016 | Mezaki et al. | | |
| 2017/0204282 A1* | 7/2017 | Illsley | C08F 283/008 | |
| 2019/0382602 A1* | 12/2019 | Contractor | C09D 11/037 | |

FOREIGN PATENT DOCUMENTS

| | | | | |
|---|---|---|---|---|
| JP | 2006306447 A | 11/2006 | | |
| JP | 3863162 B2 | 12/2006 | | |
| JP | 2012188498 A | 10/2012 | | |
| JP | 2012189994 A | 10/2012 | | |
| JP | 2015180539 A | 10/2015 | | |
| JP | 2016221922 A | 12/2016 | | |
| JP | 2018070820 A | 5/2018 | | |
| JP | 2018131481 A | 8/2018 | | |
| JP | 2019111782 A * | 7/2019 | | |
| WO | WO-2006092407 A1 * | 9/2006 | | B32B 1/08 |
| WO | 2015119096 A1 | 8/2015 | | |

OTHER PUBLICATIONS

Machine translation of JP2019-111782A, published Jul. 2019, Powered by EPO and Google. (Year: 2019).*

Machine translation of WO2006/092407A1, published Sep. 2006, Powered by EPO and Google. (Year: 2006).*

Hong, Ultraviolet-Curing Behavior of an Epoxy Acrylate Resin System, Journal of Applied Polymer Science, 2005, vol. 98, pp. 1180-1185. (Year: 2005).*

Factor, Determination of Residual Unsaturation in Photo-Cured Acrylate Formulations Using Photoacoustic FT-IR Spectroscopy, 1991, Applied Spectroscopy, vol. 45, No. 1, pp. 135-138. (Year: 1991).*

Jöhnck, Quantitative determination of unsaturation in photocured halogenated acrylates and methacrylates by FT-IR and Raman-spectroscopy and by thermal analysis, 1999, Polymer 40, pp. 3631-3640. (Year: 1999).*

* cited by examiner

*Primary Examiner* — Monique R Jackson
(74) *Attorney, Agent, or Firm* — The Webb Law Firm

(57) ABSTRACT

An embodiment of the present invention relates to a multilayer body and a method for producing the multilayer body, and the multilayer body includes a metal base, and a cured layer 1, the cured layer 1 having a curing ratio of 70 to 90% on the metal base side, and the cured layer 1 having a curing ratio of 50 to 70% on the side opposite to the metal base side.

13 Claims, No Drawings

MULTILAYER BODY AND METHOD FOR PRODUCING MULTILAYER BODY

CROSS-REFERENCE TO RELATED APPLICATIONS

This application is the United States national phase of International Application No. PCT/JP2020/003748 filed Jan. 31, 2020, and claims priority to Japanese Patent Application No. 2019-023387 filed Feb. 13, 2019, the disclosures of which are hereby incorporated by reference in their entirety.

TECHNICAL FIELD

An embodiment of the present invention relates to a multilayer body and a method for producing the multilayer body.

BACKGROUND ART

Base material made of metal (also referred to as "metal base", hereinafter) has been used in a variety of applications, in which the surface thereof has a cured layer obtainable by using, for example, a curable composition, which is formed depending on desired purposes.

For example, a metal tube such as aluminum tube has been used as a packaging container for packaging contents such as cosmetic, medicine and quasi-drug, for its capability of protecting the contents against light (ultraviolet radiation), air (gas) or water (vapor), and for its excellence of, for example, non-airback property, portability and usability.

For example, Patent Literature JP 2006-306447 describes this sort of metal tube having formed thereon a coating film (cured layer) of a synthetic resin coating material, aimed at suppressing discoloration or corrosion of the tube due to the contents.

SUMMARY OF INVENTION

Technical Problem

The cured layer, when formed on the metal base as described above, is required to be highly adhesive to the metal base. The metal base and the cured layer need to tightly adhere, particularly even if the metal base were deformed by, for example, folding or squashing during use in some applications. Conventional cured layer formed on the metal base has, however, not been adherent enough to the metal base.

It is therefore an embodiment of the present invention to provide a multilayer body having a cured layer which is highly adherent to the metal base, particularly even if the metal base were folded or squashed.

Solution to Problem

The present inventors found that a specific multilayer body can solve the problem, and arrived at the present invention.

Exemplary structures of the present invention are as follows.

[1] A multilayer body including:
- a metal base; and a cured layer 1,
- the cured layer 1 having a curing ratio of 70 to 90% on the metal base side, and the cured layer 1 having a curing ratio of 50 to 70% on the side opposite to the metal base side.

[2] The multilayer body according to [1], in which the cured layer 1 is a layer obtainable by using a curable composition that contains a curable compound and a polymerization initiator.

[3] The multilayer body according to [2], in which the polymerization initiator contains a compound that can initiate polymerization upon irradiation of ultraviolet radiation from an ultraviolet LED.

[4] The multilayer body according to any of [1] to [3], including the metal base, the cured layer 1, and a cured layer 2 different from the cured layer 1 stacked in this order.

[5] The multilayer body according to [4], in which the cured layer 1 is a coloring pigment-free layer, and the cured layer 2 is a coloring pigment-containing layer.

[6] The multilayer body according to any of [1] to [5], in which the metal base is an aluminum base.

[7] The multilayer body according to any of [1] to [6], in which the metal base is an aluminum tube.

[8] A method for producing the multilayer body according to any of [1] to [7], the method including
- a step 1 of applying a curable composition on a metal base, followed by curing.

[9] The method for producing according to [8], in which the step 1 includes irradiating ultraviolet radiation with use of an ultraviolet LED.

Advantageous Effects of Invention

According to an embodiment of the present invention, there can be provided a multilayer body having a cured layer which is highly adherent to the metal base, particularly even if the metal base were folded or squashed.

Further, an embodiment of the present invention also makes it possible to easily obtain a multilayer body having a cured layer which is highly adherent to the metal base, has a large L-value, and excels in chemical resistance.

DESCRIPTION OF EMBODIMENTS

<<Multilayer Body>>

A multilayer body according to an embodiment of the present invention (also referred to as "the present multilayer body", hereinafter) includes a metal base, and a cured layer 1,
- the cured layer 1 has a curing ratio (also referred to as "internal curing ratio", hereinafter) of 70 to 90% on the metal base side, and the cured layer 1 has a curing ratio (also referred to as "surface curing ratio", hereinafter) of 50 to 70% on the side opposite to the metal base side.

Note that the internal curing ratio in the present invention means a curing ratio in a part of the cured layer 1 most closely adjoining to the metal base, which is found, when assuming the thickness of the cured layer 1 as a μm, to be nearly equal to a curing ratio of the cured layer 1 measured 0.1× a μm away from the surface adjoining to the base (assuming the level of surface of the cured layer 1 adjoining to the base as 0 μm). The internal curing ratio adopted here is therefore a value of curing ratio of the cured layer 1 measured 0.1× a μm away from the surface adjoining to the base.

Also note that the surface curing ratio in the present invention means a curing ratio of the surface of the cured layer 1, which is found, when assuming the thickness of the cured layer 1 as a μm, to be nearly equal to a curing ratio of the cured layer 1 measured 0.9× a μm away from the surface adjoining to the base (assuming the level of surface of the cured layer 1 adjoining to the base as 0 μm). The surface curing ratio adopted here is therefore a value of curing ratio of the cured layer 1 measured 0.9× a μm away from the surface adjoining to the base.

The cured layer, when formed by using a curable composition, is fully cured in most cases, whose surface curing ratio is uncommonly remained to be 50 to 70% as described above.

The present inventors, however, found from thorough investigations focused on the curing ratio of the cured layer formed on the metal base, particularly on the curing ratio on the metal base side, and the curing ratio on the side opposite to the metal base side, that adjustment of these values within specific ranges can yield the multilayer body that includes the cured layer which is highly flexible, highly adherent to the metal base even if the metal base were folded or squashed, and excels in chemical resistance.

The curing ratio can be calculated on the basis of the amount of structure (peak intensity, for example), which disappear as a result of curing reaction, measured before and after the curing. In an exemplary case where a curable composition used here has a carbon-carbon unsaturated double bond (C═C bond), and the double bond is consumed during the curing, the curing ratio can be calculated by measuring the content (peak intensity) of double bond in the curable composition, and the content (peak intensity) of double bond contained in the cured layer 1.

The amount of structure (peak intensity) that disappears as a result of the curing reaction can be measured by using any of known measuring instruments such as ultraviolet spectrophotometer, $^{13}$C-NMR, $^{1}$H-NMR and Fourier transform infrared spectrophotometer (FT-IR).

When using the FT-IR, the curing ratio can be calculated, for example, by the method described later in Examples. Note, in this case, since the base line would shift every time the FT-IR spectrometry takes place, so that it is preferred to use a peak assignable to a structure irrelevant to the curing reaction (benzene ring, for example) as a reference signal, to correct the peak intensity assignable to the structure that disappear as a result of the curing reaction.

The internal curing ratio is preferably 75 to 90%, and more preferably 80 to 90%, in view of obtaining the cured layer which is more highly adherent to the metal base, and is further highly adherent to the metal base particularly even if the metal base were, for example, folded or squashed.

With the internal curing ratio fallen below 70% or exceeding 90%, the cured layer would be less adherent to the metal base, and particularly would be more likely to cause crack or separation in the crusher test described later.

The internal curing ratio may be measured specifically by the method described later in Examples.

The surface curing ratio is preferably 52 to 70%, in view of obtaining the cured layer 1 which is more highly adherent to the metal base, and further highly adherent to the metal base particularly even if the metal base were, for example, folded or squashed, and which excels in chemical resistance even if the thickness of the cured layer 1 were thin.

With the surface curing ratio fallen below 50% or exceeding 70%, the cured layer would be less adherent to the metal base, and particularly would be more likely to cause crack or separation in the crusher test described later.

In a case where the present multilayer body has any other layer, such as a cured layer 2 described later, formed on the cured layer 1, the surface curing ratio means a curing ratio measured on the surface of the cured layer 1 after removing such other layer by a method such as shaving, and may specifically be measured by the method described later in Examples.

The cured layer 1 having the aforementioned curing ratio may be formed, typically by irradiating ultraviolet radiation to a curable composition, by using an ultraviolet LED.

The cured layer 1 is preferably provided on the surface of the metal base, either over the entire surface of the metal base, or on a part of the metal base.

Although there might be some known layer, such as an adhesive layer, between the metal base and the cured layer 1, an embodiment of this invention can obtain the multilayer body in which the metal base and the cured layer 1 are tightly adhere without relying upon such a known layer. Considering cost of production, ease of production of the multilayer body, and effectively exhibiting the effects of the invention, such a known layer is preferably absent.

The present multilayer body is not specifically limited so long as it has the metal base and the cured layer 1, but may have some other layer besides them, depending on desired purposes. In view of, for example, easily obtaining the multilayer body that excels in chemical resistance, or, for example, of easily obtaining the multilayer body having a large L-value, the present multilayer body preferably has the metal base, the cured layer 1, and a cured layer 2 which is different from the cured layer 1, which are particularly preferably stacked in this order.

The metal base, especially metal container, occasionally has provided thereon a printed layer, for example, for the purposes of indication of the content or for good appearance. The printed layer, if directly provided on the metal base, would make the indication of the printed layer less recognizable, so that a usually preferred way is to provide a colored layer, preferably a white layer, on the metal base, and the printed layer is provided thereon.

In view of obtaining the multilayer body on which the indication of the printed layer, provided, for example, for indication of the content or for good appearance, is clearly recognizable, the multilayer body preferably has a large L-value, which specifically falls in the range described below. This sort of multilayer body is presumably obtainable by increasing the content of a coloring pigment in the colored layer, or by thickening the colored layer. Increase of the content of coloring pigment or thickening of the colored layer may, however, make the obtainable colored layer less flexible, making it difficult to obtain the cured layer that is highly adherent to the metal base, particularly even if the metal base were folded or squashed.

The colored layer is obtainable by adding the coloring pigment to the cured layer 1. However, in a case where the multilayer body is required to have a large L-value, which is more specifically an L-value fallen in the range described below, the present multilayer body preferably has the metal base, the cured layer 1 and the coloring layer, in view of easily obtaining the present multilayer body that has the L-value as described below, and has the cured layer that is highly adherent to the metal base, particularly even if the metal base were deformed by folding or squashing. The present multilayer body more preferably has these layers stacked in this order, and particularly preferably has the metal base, the cured layer 1 free of coloring pigment, and the cured layer 2 (colored layer) that contains the coloring pigment stacked in this order.

The cured layer 1 and the cured layer 2 may occasionally and collectively be referred to as "coated layer".

To obtain the multilayer body with a large L-value, and to obtain the multilayer body with the cured layer which is highly adherent to the metal base, were in a trade-off relation, which could not have been concurrently satisfied by the prior art. In contrast, the multilayer body having such coated layer can concurrently satisfy these properties.

In view of easily obtaining the multilayer body on which the indication of the printed layer, provided for indication of the content or for good appearance, is clearly recognizable, the present multilayer body preferably has an L-value (when measured from the side opposite to the metal base [from the cured layer 1 or the coated layer side, for example]) of 90 or larger, which is more preferably 91 or larger. The upper limit of the L-value is not specifically limited, since the larger the better, which is typically 95.

The L-value may be measured specifically by the method described later in Examples.

Color of the present multilayer body when viewed from the side opposite to the metal base (from the cured layer 1 or the coated layer side, for example), although selectable suitably depending on desired applications or customer needs, is preferably nearly white, in view of, for example, easily obtaining the multilayer body on which the indication of the printed layer, provided, for example, for indication of the content or for good appearance, is clearly recognizable.

Although a nearly white composition is less likely to cure and so that the multilayer body with desired physical properties is not easily obtainable, by the present multilayer body having the coated layer, the multilayer body with the desired physical properties can obtain and the effects of this invention can demonstrate in an enhanced manner. The color is therefore preferably nearly white.

Now nearly white herein includes not only pure white, but also, for example, yellowish white, bluish white, greenish white and reddish white.

<<Metal Base>>

The metal base, although not specifically limited, is preferably a flexible base typically in view of effectively exhibiting the effects of the invention, and is preferably a base which is foldable, squashable or squeezable.

The metal is exemplified by aluminum, copper, tin, lead, nickel, and alloys that contain any of these metals. Among them, aluminum is preferred typically in view of, for example, effectively exhibiting the effects of the invention.

Also shape of the base is not specifically limited, and is exemplified by plate (foil) shape and desired container shapes. Among them, desired container shapes are preferred in view of, for example, effectively exhibiting the effects of the invention, and tube shape is further preferred.

Hence, the base is preferably a tube container, and is more preferably a tube container for packaging, for example, cosmetic, medicine or quasi-drug.

With use of the base composed of an aluminum tube, obtainable is the multilayer body which is capable of completely protecting the content from light (ultraviolet radiation), air (gas) or water (vapor), and which excels in non-airback property, portability and usability.

Thickness of the base (thickness of container), although not specifically limited, is preferably 0.10 to 0.15 mm, and more preferably 0.10 to 0.12 mm.

Although the base having such thickness can easily deform, the multilayer body obtainable by an embodiment of this invention will have the base highly adherent to the cured layer 1 or to the coated layer, even if the base were thus deformed.

<Cured Layer 1>

The cured layer 1 is not specifically limited, so long as the internal curing ratio and the surface curing ratio thereof will fall in the aforementioned ranges in the finally obtainable multilayer body.

Such cured layer 1 is obtainable by using a curable composition (also referred to as "first composition", hereinafter), and is preferably a cured body of the first composition. The first composition is preferably a composition that contains a curable compound and a polymerization initiator.

The cured layer 1, although the thickness thereof is not particularly limited, will tend to be less adherent to the metal base, and will tend to be less adherent particularly in the crusher test when thickened, so that the thinner the better. In a case where a coloring pigment-containing composition is used as the first composition, the thickness of the cured layer 1 is preferably determined while considering the amount of coloring pigment in the composition so that the appearance will have a desired color, and particularly so that the L-value will fall in the aforementioned ranges.

The thickness of the cured layer 1 is preferably 5 μm or larger, more preferably 7 μm or larger, meanwhile preferably 20 μm or smaller, more preferably 10 μm or smaller, and particularly preferably 8 μm or smaller.

[First Composition]

The first composition, which is not specifically limited so long as it is curable, is preferably an active energy ray-curable composition.

The coloring layer has previously been formed using a thermosetting composition. On the other hand, by using the active energy ray-curable composition, there is no longer necessary to use a long furnace which has previously been necessary to cure the prior thermosetting composition, thus making it possible to, for example, reduce costs for electric power and facility, and making it possible to efficiently produce the present multilayer body while reducing environmental load.

The active energy ray-curable composition is preferably a composition that is curable with an ultraviolet LED, in view of easily obtaining the cured layer 1 having the aforementioned curing ratio. With use of the composition curable with an ultraviolet LED, the cured layer 1 having a desired curing ratio is easily obtainable efficiently in a short time and in a smaller workspace. With use of an ultraviolet LED for curing, the composition may also be cured without excessively heating an object to be irradiated, making it possible to easily obtain the desired cured layer.

The ultraviolet LED is not specifically limited so long as it is an LED (light emitting diode) capable of irradiating ultraviolet radiation.

In view of, for example, easily forming the cured layer with desired curing ratio, the ultraviolet LED is preferably any of LEDs whose ultraviolet radiation emitted therefrom has the peak wavelength in the UVC region, UVB region, UVA region, UVA2 region or UVV region, and more preferably any of LEDs whose ultraviolet radiation emitted therefrom has the peak wavelength in the UVA region or UVA2 region.

The peak wavelength means a wavelength at which the emission intensity is maximum in an emission spectrum, which is measurable by using a commercially available spectrophotometer.

The ultraviolet LED usable here may be any of commercially available ones whose wavelength peaks at 355 nm, 360 nm, 365 nm, 370 nm, 375 nm, 385 nm, 395 nm, 400 nm or 405 nm. Among them, LEDs having the peak wavelength in the range from 360 to 395 nm are preferred.

The active energy ray-curable composition may be any of known composition, in which the curable composition is preferably a composition that contains, as the curable compound, one kind or two or more kinds of compound having ethylenic unsaturated double bond, and is more preferably a compound that contains one kind or two or more kinds of (meth)acrylic compound.

The (meth)acrylic compound, for which any of known compounds is applicable, preferably contains one kind or two or more kinds of bifunctional or higher multifunctional (meth)acrylates, in view of, for example, more easily obtaining the multilayer body that exhibits desired effects.

In view of, for example, more easily obtaining the multilayer body that exhibits desired effects, the composition preferably contains, as the multifunctional (meth)acrylate, a multifunctional urethane (meth)acrylate and/or a multifunctional epoxy (meth)acrylate, and more preferably contains both of them.

The active energy ray-curable composition may have, for example, polymerization initiator, pigment and/or dispersant contained therein. Only one kind, or two or more kinds of each of these components may be used.

Particularly in view of, for example, easily obtaining the composition curable with the ultraviolet LED, the first composition preferably contains a photopolymerization initiator as the polymerization initiator, and more preferably contains a compound capable of initiating polymerization upon irradiation with ultraviolet radiation by using the ultraviolet LED.

Such compound usable here may be any of known compounds, to which photopolymerization initiators described in JP 2012-189994 A and JP 2018-70820 A, for example, are applicable.

Among them, acylphosphine oxide photopolymerization initiator and α-hydroxyketone photopolymerization initiator are preferred in view of, for example, easily obtaining the cured layer with desired curing ratio. Acylphosphine oxide-based photopolymerization initiator is further preferred.

The acylphosphine oxide photopolymerization initiator is exemplified by 2,4,6-trimethylbenzoyl-diphenylphosphine oxide, bis(2,6-dimethylbenzoyl)-ethylphosphine oxide, bis(2,6-dimethoxybenzoyl)-2,4,4-trimethyl-pentylphosphine oxide, and bis(2,4,6-trimethylbenzoyl)-phenylphosphine oxide.

The α-hydroxyketone photopolymerization initiator is exemplified by 1-hydroxy-cyclohexyl-phenyl-ketone, 2-hydroxy-2-methyl-1-phenyl-propane-1-one, 1-[4-(2-hydroxyethoxy)-phenyl]-2-hydroxy-2-methyl-1-propane-1-one, and 2-hydroxy-1-{4-[4-(2-hydroxy-2-methyl-propionyl)-benzyl]phenyl}-2-methyl-propane-1-one.

Content of the photopolymerization initiator, per 100% by mass of non-volatile component of the active energy ray-curable composition, is preferably 0.1 to 30% by mass, and more preferably 0.5 to 25% by mass.

The first composition, which may be either coloring pigment-containing composition or coloring pigment-free composition, is preferably the coloring pigment-free composition in view of, for example, easily obtaining the cured layer that is highly adherent to the metal base, particularly even if the metal base were deformed by folding or squashing.

The coloring pigment is exemplified by titanium oxide, zinc oxide, cerium oxide, aluminum oxide, yellow iron oxide, black iron oxide, red iron oxide, Prussian blue, ultramarine, chromium oxide, chromium hydroxide, manganese violet, cobalt titanate and carbon black. Among them, titanium oxide is preferred, in view of easily obtaining the multilayer body on which the indication of the printed layer, provided, for example, for indication of the content or for good appearance, is clearly recognizable.

The coloring pigment may be used singly, or two or more kinds.

<Cured Layer 2>

For the reason described previously, the present multilayer body preferably has the cured layer 2 different from the cured layer 1.

Although such cured layer 2 might be a layer formed using the first composition but with the curing ratio differed from that of the cured layer 1, the cured layer 2 is preferably a layer (cured body of second composition) obtainable by using a curable composition (also referred to as "second composition", hereinafter) different from the first composition.

The first composition is preferably the coloring pigment-free composition, and the second composition is preferably the coloring pigment-containing composition, in view of, for example, easily obtaining the multilayer body having the coated layer which is highly adherent to the metal base, even if the metal base were deformed by folding or squashing, has a large L-value, and excels in chemical resistance.

The second composition in this case is preferably a compound equivalent to the first composition, except that the coloring pigment is blended with the first composition.

Pigment weight concentration (PWC) of the coloring pigment in the non-volatile component in the coloring pigment-containing composition is preferably 25 to 50%, in view of, for example, easily obtaining the multilayer body having the coated layer that has a desired L-value and is highly adherent to the metal base, which is more preferably 40 to 50%.

The curing ratio of the surface of the cured layer 2 (the surface of the cured layer 2 on the side opposite to the cured layer 1), in the finally obtainable multilayer body, is preferably 70 to 90%, and more preferably 80 to 90%.

With the curing ratio of the cured layer 2 in the multilayer body fallen in the aforementioned ranges, a particularly highly flexible coated layer will be easily obtainable, making it possible to easily obtain the multilayer body having a desired L-value, and having the coated layer which is highly adherent to the metal base.

The curing ratio is adjustable by properly selecting, for example, cumulative dose of ultraviolet irradiation, or irradiation dose of electron beam irradiation. The curing ratio may be measured specifically by a method equivalent to that for measuring the curing ratio of the cured layer 2 described later in Examples.

The cured layer 2, although the thickness thereof is not particularly limited, will tend to be less adherent to the metal base, and will tend to be less adherent particularly in the crusher test when thickened, so that the thinner the better. In a case where a coloring pigment-containing composition is used as the second composition and a coloring pigment-free composition is used as the first composition, the thickness of the cured layer 2 is preferably determined while considering the amount of coloring pigment in the composition so that the appearance will have a desired color, and particularly so that the L-value will fall in the aforementioned ranges.

The thickness of the cured layer 2 is preferably 5 to 20 μm, more preferably 5 to 10 μm.

The cured layer 2 is preferably provided on the surface of the cured layer 1, either over the entire surface of the cured layer 1, or on a part of the cured layer 1.

Although there might be some known layer, such as an adhesive layer, between the cured layer 1 and the cured layer 2, an embodiment of this invention can obtain the multilayer body in which the cured layer 1 and the cured layer 2 are tightly bound without relying upon such a known layer. Considering, for example, cost of production, and ease of production of the multilayer body, such a known layer is preferably absent.

<Printed Layer>

The present multilayer body preferably has the printed layer additionally. Although the printed layer might be provided between the cured layer 1 and the cured layer 2 if the cured layer 2 is a coloring pigment-free layer, the printed layer is preferably provided on the cured layer 2 on the side thereof opposite to the cured layer 1, in view of, for example, easily obtaining the multilayer body with the coated layer that is more highly adherent to the metal base.

The printed layer is not specifically limited so long as it is a layer having been provided, for example, for indication of the content or for good appearance, and may be a layer formed of the cured layer 1 or the cured layer 2 having, for example, characters directly printed thereon, or may be a printing ink layer of, for example, acryl, epoxy, polyester, polyurethane ink.

<Method for Producing Multilayer Body>

Method for producing the present multilayer body, although not specifically limited, is preferably a method that includes step 1 of applying the first composition on the metal base, followed by curing; meanwhile method for producing the present multilayer body having the cured layer 2 is preferably a method that includes step 1, and step 2 of applying the second composition on the layer obtained in step 1, followed by curing.

Method for applying the first or second composition is not specifically limited, to which applicable is any of known ordinary methods such as roll coating, flow coating, airless spraying, air spraying, brush coating, trowel coating, roller coating, various types of printing, dipping, pull-up coating, flow coating, and putty application.

The applying at this time is preferably conducted so as to adjust the thickness of the obtainable cured layer 1 and the cured layer 2 within the aforementioned ranges.

The method may optionally include, in step 1 and/or step 2, a step of subjecting the surface to be applied to surface treatment according to any of known methods, before applying the composition.

The method may optionally include, in step 1 and/or step 2, a step of heating the applied composition, after applying the composition, and before curing it.

Heating temperature at this time may be properly determined depending on the composition used, without special limitation, which is preferably 50 to 80° C., and more preferably 70 to 80° C.

Although method of curing in step 1 is not specifically limited, ultraviolet irradiation with use of the ultraviolet LED is preferred, in view of, for example, easily obtaining the cured layer 1 with desired curing ratio, reducing, for example, the costs for electric power, and facility, and making it possible to efficiently produce the present multilayer body within a short time while reducing environmental load.

In this case, only one type of ultraviolet LED may be used, or two or more types of ultraviolet LED with different peak wavelengths may be used.

The curing in step 1 may only be conducted so that the cured layer 1 in the finally obtainable multilayer body will have the curing ratio fallen in the aforementioned ranges. Since in most cases the curing ratio of the cured layer 1 formed in step 1 does not largely change after going through, for example, the undermentioned step 2, so that the curing is preferably conducted so that the cured layer 1 obtainable in step 1 will have the curing ratio fallen in the aforementioned ranges of the internal curing ratio and the surface curing ratio, in view of, for example, easily obtaining the cured layer 1 with desired curing ratio.

This way of curing also makes it possible to reduce, for example, the time and cost of production of the present multilayer body, and to easily obtain the multilayer body in which the cured layer 1 and the cured layer 2 are more tightly adhered.

Conditions for irradiation with use of the ultraviolet LED are not specifically limited so long as the cured layer 1 with desired curing ratio is obtainable, in which the cumulative dose is preferably 1000 to 4000 mJ/cm$^2$, and more preferably 2000 to 4000 mJ/cm$^2$.

Irradiation intensity is preferably 2000 to 5000 mW/cm$^2$.

Although method of curing in step 2 is not specifically limited, ultraviolet irradiation is preferred, in view of, for example, easily obtaining the cured layer 2 with desired curing ratio, reducing, for example, the costs for electric power, and facility, and making it possible to efficiently produce the present multilayer body while reducing environmental load.

Conditions of ultraviolet irradiation are not specifically limited, but it is preferred that the cured layer 2 with desired curing ratio is obtainable. The irradiation intensity is preferably 400 to 600 mW/cm$^2$, and more preferably 450 to 600 mW/cm$^2$, meanwhile the cumulative dose is preferably 600 to 2500 mJ/cm$^2$, and more preferably 1500 to 2500 mJ/cm$^2$.

Between step 1 and step 2, or after step 2, preferably after step 2, the printed layer may be formed by directly printing, for example, characters on the cured layer 1 or the cured layer 2, optionally followed by drying and/or curing; or by applying the printing ink on the cured layer 1 or the cured layer 2, optionally followed by drying and/or curing.

EXAMPLES

The present invention will further be detailed referring to Examples, to which the present invention is by no means limited.

Preparation Example 1

Composition 1 was prepared by mixing 96 parts by mass of an acrylic coating material (containing bisphenol A-type epoxy acrylate [polyfunctional acrylate], with a non-volatile content of 50% by mass), and 4 parts by mass of bis(2,4,6-trimethylbenzoyl)-phenylphosphine oxide.

Preparation Example 2

Composition 2 was prepared by mixing 65.6 parts by mass of an acrylic coating material (containing bisphenol A-type epoxy acrylate [polyfunctional acrylate], with a non-volatile content of 50% by mass), 0.5 parts by mass of an α-hydroxyalkylphenone polymerization initiator, 1.0 part by mass of an acylphosphine oxide polymerization initiator, and 32.8 parts by mass of titanium oxide.

Example 1

Composition 1 was applied on the surface of an aluminum tube (tube base) of approximately 0.1 mm thick, so that the obtainable cured layer 1 will have a thickness of 8 μm. The surface on which Composition 1 was applied was then irradiated with ultraviolet radiation with use of an ultraviolet LED (manufactured by Hamamatsu Photonics K.K.), so as to adjust the cumulative dose to 2400 mJ/cm$^2$, thereby producing a base with the cured layer 1.

Examples 2 to 4, and Reference Examples 1 to 3

Bases with the cured layer 1 were produced in the same way as in Example 1, except that values of the cumulative dose were changed as summarized in Table 1.

Comparative Example 1

A base with the cured layer 1 was produced in the same way as in Example 1, except that ultraviolet radiation was irradiated so as to adjust the cumulative dose to 2000 mJ/cm$^2$, by using a UV lamp (manufactured by GS Yuasa Corporation) in place of the ultraviolet LED.

The cumulative dose in Examples 1 to 4 and Reference Examples 1 to 3 was cumulative dose of ultraviolet radiation in the UVA2 region irradiated when the cured layer 1 was formed, measured by using LEDCURE L395 (manufactured by EIT LLC).

On the other hand, the cumulative dose in Comparative Example 1 was cumulative dose of ultraviolet radiation in the UVA region irradiated when the cured layer 1 was formed, measured by using UV Power Puck II (manufactured by EIT LLC).

<Surface Curing Ratio>

The surface curing ratio (curing ratio of the cured layer 1 on the side opposite to the metal base) was calculated on the basis of the amount of structure (peak intensity) that disappeared as a result of the curing reaction, found by measuring Composition 1 used here and the resultant cured layer 1 by FT-IR (ATR method). A specific calculation is as follows.

From an FT-IR spectrum of Composition 1, peak intensity A at 1510 cm$^{-1}$ assigned to stretching vibration of benzene ring, and peak intensity B at 1410 cm$^{-1}$ assigned to C=C bond were determined.

Next, the cured layer 1 was shaved towards the base with use of a sand paper (grit size: #600 to #1000) down to 7.2 μm thick (0.9×8), and thus shaved surface was subjected to FT-IR spectrometry. Peak intensity A' at 1510 cm$^{-1}$ assigned to stretching vibration of benzene ring, and peak intensity B' at 1410 cm$^{-1}$ assigned to C=C bond were determined on the spectrogram, and the peak intensity at 1410 cm$^{-1}$ in the FT-IR spectrum measured on the surface of the cured layer 1 was corrected, on the basis of ratio of peak intensities at 1510 cm$^{-1}$ of the Composition 1 and the surface of the cured layer 1.

The curing ratio was calculated from the equation below. Results are summarized in Table 1.

$$\text{Curing ratio } [\%] = \{1 - ((B'/A')/(B/A))\} \times 100$$

<Internal Curing Ratio>

The internal curing ratio (curing ratio of the cured layer 1 on the side adjoining to the metal base) was determined in the same way as for the surface curing ratio, except that the FT-IR spectrum was measured on the shaved surface obtained by shaving the formed cured layer 1 towards the base with use of a sand paper (grit size: #600 to #1000) down to 0.8 μm thick (0.1×8), rather than on the surface of the cured layer 1. Results are summarized in Table 1.

TABLE 1

| | Cumulative dose (mJ/cm$^2$) | Surface curing ratio (%) | Internal curing ratio (%) |
|---|---|---|---|
| Example 1 | 2400 | 52.2 | 70.0 |
| Example 2 | 3400 | 52.4 | 72.4 |
| Example 3 | 3700 | 53.3 | 80.8 |
| Example 4 | 4000 | 65.2 | 85.1 |
| Reference Example 1 | 350 | 46.6 | 58.1 |
| Reference Example 2 | 350 | 48.3 | 61.5 |
| Reference Example 3 | 350 | 50.2 | 66.1 |
| Comparative Example 1 | 2000 | 88.0 | 87.2 |

Example 5

Composition 2 was applied on the cured layer 1 of the bases with the cured layer 1, obtained in Example 1, so that the obtainable cured layer 2 will have a thickness of 8 μm. The surface on which Composition 2 was applied was then irradiated with ultraviolet radiation with use of the UV lamp (manufactured by GS Yuasa Corporation), so as to adjust the cumulative dose to 2000 mJ/cm$^2$, thereby producing a multilayer body that contains a base, the cured layer 1, and the cured layer 2 in this order.

The curing ratio of the surface of the obtained cured layer 2 (surface of the cured layer 2 on the side opposite to the cured layer 1) was found to be 85.1%. The curing ratio of the cured layer 2 was calculated in the same way as for the surface curing ratio of the cured layer 1, except that the measurement was made on the surface of the formed cured layer 2 per se, rather than on the surface shaved with sand paper, on which the surface curing ratio of the cured layer 1 was measured.

Note that, from the multilayer body thus obtained in Example 5, the cured layer 2 and a 0.8 μm thick portion of the cured layer 1 were shaved with use of the sand paper, and the curing ratio was measured on the resultant surface in the same way as described previously. And the internal curing ratio of the cured layer 1 was also measured in the same way as described previously. The surface curing ratio and the internal curing ratio of the cured layer 1 after having the cured layer 2 formed thereon, were found to be almost equal to the values measured before forming the cured layer 2.

Examples 6 to 8, Reference Examples 4 to 6, and Comparative Example 2

The multilayer bodies of Examples 6 to 8, Reference Examples 4 to 6, and Comparative Example 2 were produced in the same way as in Example 5, except that the bases with the cured layer 1, obtained in Examples 2 to 4, Reference Examples 1 to 3 and Comparative Example 1 were respectively used, in place of the base with the cured layer 1 obtained in Example 1.

Note that, from the multilayer body thus obtained in these test examples, the cured layer 2 and a 0.8 μm thick portion of the cured layer 1 were shaved with use of the sand paper, and the curing ratio was measured on the resultant surface in the same way as described previously. And the internal curing ratio of the cured layer 1 was also measured in the same way as described previously. The surface curing ratio and the internal curing ratio of the cured layer 1 after having the cured layer 2 formed thereon, were found to be almost equal to the values measured before forming the cured layer 2. In other words, each of the cured layers 1 of the multilayer bodies obtained in Examples 5 to 8 was found to have the surface curing ratio that satisfies the range from 50 to 70%, and to have the internal curing ratio that satisfies the range from 70 to 90%, whereas each of the cured layers 1 of the multilayer bodies obtained in Reference Examples 4 to 6 and Comparative Example 2 was found to have the surface curing ratio and/or the internal curing ratio that do not satisfy these ranges.

<L-Value>

L-value of the thus obtained multilayer bodies was measured by using a spectrophotometer "CM-2600d" manufactured by Konica Minolta, Inc. With the L-value of 90 or larger, the obtained multilayer body is judged to have a desired appearance (color).

Ten samples each of the multilayer bodies obtained in the individual test examples were measured, and averaged values were calculated. Results are summarized in Table 2.

<Cross-Cut Test>

Cross-cut test was conducted as below.

The multilayer bodies obtained above were prepared, from which any foreign matter such as dirt, dust and oil on the cured layer 2 of the multilayer body was removed, and such area after the removal was cut (to the depth that reaches the base) so as to form eleven lines aligned at 1 mm intervals both vertically and laterally. A 15 mm wide cellophane tape (manufactured by Nichiban Co., Ltd.) was pressed onto the thus cut surface, and the cellophane tape, held at one end, was then peeled off rapidly with an approximately 90° angle against the surface of coated film. From among formed 100 cells, the area remained on the base was determined as a ratio of residual area (%) of the cured layer 2. Results were represented by AA if the ratio of residual area was 100%; represented by BB if the ratio was 95% or larger and smaller than 100%; represented by CC if the ratio was 85% or larger and smaller than 95%; and represented by DD if the ratio was smaller than 85%.

Ten samples each of the multilayer bodies obtained in the individual test examples were measured, and averaged values were calculated. Results are summarized in Table 2.

Since, as described previously, the curing ratio of the cured layer 1 remains almost unchanged even after forming thereon the cured layer 2, so that the cross-cut test, even conducted similarly on the base with the cured layer 1 obtained in Examples 1 to 4, would be equivalent results with Examples 5 to 8.

<Crusher Test>

Crusher test was conducted as below.

The multilayer body thus obtained was held upright on a stage, and the multilayer body was crushed by dropping thereon a 2 kg weight from 50 cm above the end of the multilayer body opposite to the stage.

Results were represented by AA if the cured layer 2 on the crushed multilayer body was found to remain free of crack and separation; represented by BB if a part of the cured layer 2 was found to slightly cause crack or separation when viewed from the side of the cured layer 2, with the base kept invisible; represented by CC if the cured layer 2 was found to cause a lot of cracks or separations when viewed from the side of the cured layer 2, with the base visible; and represented by DD if the cured layer 2 separated even under soft touch with a finger.

Ten samples each of the multilayer bodies obtained in the individual test examples were measured, and averaged values were calculated. Results are summarized in Table 2.

Since, as described previously, the curing ratio of the cured layer 1 remains almost unchanged even after forming thereon the cured layer 2, so that the crusher test, even conducted similarly on the base with the cured layer 1 obtained in Examples 1 to 4, would be equivalent results with Examples 5 to 8.

<Chemical Resistance Test>

Chemical resistance test was conducted as below.

Approximately 0 g of 0.3% Hirudoid Cream was applied to one surface of the thus obtained multilayer body, and the multilayer body was placed in a thermo-hygrostat chamber, and stored in an environment with a temperature of 40° C. and a humidity of 75% for one week. After the one-week storage, the multilayer body was taken out, and the cream on the multilayer body was wiped off with KimWipes (manufactured by Nippon Paper Crecia Co., Ltd.). The surface from which the cream has been wiped off is then rubbed ten times with a bare finger, thereby checking whether there was any lifting or separation of the cured layer on the multilayer body. If no lifting and separation was found in the cured layer on the multilayer body, approximately 0.5 g of the same cream was applied again, the multilayer body was placed in a thermo-hygrostat chamber just as before, stored for one week, and the state of the cured layer on the multilayer body was checked in the same way. The operation was repeated until any lifting or separation became observed in the cured layer of the multilayer body, up to a maximum of 10 weeks.

Cases without causing lifting and separation of the cured layer on the multilayer body even after five weeks or longer were judged to have high chemical resistance.

Twenty samples each of the multilayer bodies obtained in the individual test examples were measured, and averaged values of length of time before causing the lifting or separation of the cured layer were calculated. Results are summarized in Table 2.

TABLE 2

| | L-value | Cross-cut test | Crusher test | Chemical resistance |
|---|---|---|---|---|
| Example 5 | >90 | AA | BB | 10 Weeks or longer |
| Example 6 | >90 | AA | BB | 10 Weeks or longer |
| Example 7 | >90 | AA | AA | 10 Weeks or longer |
| Example 8 | >90 | AA | BB | 10 Weeks or longer |

TABLE 2-continued

| | L-value | Cross-cut test | Crusher test | Chemical resistance |
|---|---|---|---|---|
| Reference Example 4 | >90 | AA | DD | 10 Weeks or longer |
| Reference Example 5 | >90 | AA | DD | 10 Weeks or longer |
| Reference Example 6 | >90 | AA | DD | 10 Weeks or longer |
| Comparative Example 2 | >90 | AA | DD | 10 Weeks or longer |

Examples 9 to 10, and Reference Example 7

Composition 1 was applied on the surface of the tube base so that the obtainable cured layer 1 will have a thickness of 8 μm, and was then irradiated with ultraviolet radiation with use of an ultraviolet LED (manufactured by Hamamatsu Photonics K.K.), so as to achieve the surface curing ratio and the internal curing ratio summarized in Table 3 below, thereby producing the bases with the cured layer 1. The aforementioned test was conducted using the multilayer body that formed the cured layer 2 on the cured layer 1 of the thus obtained bases with the cured layer 1 in the same way as in Example 5. Results are summarized in Table 3.

TABLE 3

| | Cured layer 1 | | Physical Properties of multilayer body | | | |
|---|---|---|---|---|---|---|
| | Surface curing ratio (%) | Internal curing ratio (%) | L-value | Cross-cut test | Crusher test | Chemical resistance |
| Example 9 | 57.5 | 76.2 | >90 | AA | AA | 10 Weeks or longer |
| Example 10 | 63.7 | 82.5 | >90 | AA | AA | 10 Weeks or longer |
| Reference Example 7 | 53.4 | 67.8 | >90 | AA | CC | 10 Weeks or longer |

The invention claimed is:

1. A multilayer body comprising:

a metal base comprising a metal base side; and a cured layer 1 on the metal base side of the metal base, the cured layer 1 having an internal curing ratio of 70 to 90% on the metal base side, and the cured layer 1 having a surface curing ratio of 50 to 65.2% on a side opposite to the metal base side, wherein the cured layer 1 is obtained by irradiating a curable composition with an ultraviolet light emitting diode (LED), the curable composition comprising a curable compound comprising an ethylenically unsaturated double bond (C═C) and a polymerization initiator that can initiate polymerization upon irradiation with the ultraviolet LED, wherein the curable compound is a bisphenol A-type epoxy(meth)acrylate and the polymerization initiator is an acylphosphine oxide photopolymerization initiator;

wherein a thickness of the cured layer 1 is 5 to 10 microns (μm);

wherein the curing ratios are calculated from the equation:

$$\text{Curing ratio } [\%] = (1 - ((B'/A')/(B/A)) \times 100$$

wherein in an FT-IR spectrum of the curable composition, peak intensity of a peak assignable to a benzene ring at 1510 $cm^{-1}$ is peak intensity A and peak intensity of a peak assignable to the ethylenically unsaturated double bond (C═C) at 1410 $cm^{-1}$ is peak intensity B, and wherein in an FT-IR spectrum of the cured layer 1, peak intensity of a peak assignable to the benzene ring at 1510 $cm^{-1}$ is peak intensity A' and the peak intensity of the peak assignable to the ethylenically unsaturated double bond (C═C) at 1410 $cm^{-1}$ is peak intensity B', wherein the internal curing ratio on the metal base side is measured at 0.1× a thickness of the cured layer 1 away from a surface of the cured layer 1 adjoining to the metal base side of the metal base, assuming that a level of the surface of the cured layer 1 adjoining to the metal base side of the metal base is 0 μm, and wherein the surface curing ratio is measured at 0.9× a thickness of the cured layer 1 away from a surface adjoining to the metal base side of the metal base, assuming that a level of the surface of the cured layer 1 adjoining to the metal base side of the metal base is 0 μm.

2. The multilayer body according to claim 1, comprising the metal base, the cured layer 1, and a cured layer 2 different from the cured layer 1 stacked in this order.

3. The multilayer body according to claim 2, wherein a curing ratio of a surface of the cured layer 2 on a side opposite to the cured layer 1 is 70 to 90%.

4. The multilayer body according to claim 2, wherein the cured layer 1 is a coloring pigment-free layer, and the cured layer 2 is a coloring pigment-containing layer.

5. The multilayer body according to claim 4, wherein the cured layer 2 has an L-value of 90 or larger when measured from the cured layer 2, wherein the L-value is measured using a spectrophotometer.

6. The multilayer body according to claim 4, wherein the cured layer 2 is a layer formed using a coloring pigment-containing composition, wherein a pigment weight concentration (PWC) of the coloring pigment in a non-volatile component in the coloring pigment-containing composition is 25 to 50%.

7. The multilayer body according to claim 1, wherein the metal base is an aluminum base.

8. The multilayer body according to claim 7, wherein the metal base is an aluminum tube.

9. The multilayer body according to claim 1, wherein the acylphosphine oxide photopolymerization initiator is selected from the group consisting of 2,4,6-trimethylbenzoyldiphenylphosphine oxide, bis(2,6-dimethylbenzoyl)-ethylphosphine oxide, bis(2,6-dimethoxybenzoyl)-2,4,4-trimethyl-pentylphosphine oxide, and bis(2,4,6-trimethylbenzoyl)-phenylphosphine oxide.

10. The multilayer body according to claim 1, wherein the acylphosphine oxide photopolymerization initiator is bis(2,4,6-trimethylbenzoyl)-phenylphosphine oxide.

11. The multilayer body according to claim 1, wherein a content of the polymerization initiator in the curable composition is 0.1 to 30% by mass, based on 100% mass of a non-volatile component of the curable composition.

12. The multilayer body according to claim 1, wherein the metal base is a tube container of cosmetic packaging, medicine packaging, or quasi-drug packaging.

13. A method for producing the multilayer body according to claim 1, the method comprising a step 1 of applying the curable composition on the metal base side of the metal base, followed by curing the curable composition by irradiating the curable composition with the ultraviolet LED.

* * * * *